Jan. 18, 1938.  G. F. BRENDEL  2,105,634
MACHINE FOR FACING THE SURFACES OF HARD SUBSTANCES BY PRESSURE
Filed March 22, 1937  3 Sheets-Sheet 1

G. F. Brendel
INVENTOR
BY Richards & Geier
ATTORNEYS

Jan. 18, 1938. G. F. BRENDEL 2,105,634
MACHINE FOR FACING THE SURFACES OF HARD SUBSTANCES BY PRESSURE
Filed March 22, 1937 3 Sheets-Sheet 2

G. F. Brendel
INVENTOR
ATTORNEYS

Jan. 18, 1938. G. F. BRENDEL 2,105,634
MACHINE FOR FACING THE SURFACES OF HARD SUBSTANCES BY PRESSURE
Filed March 22, 1937 3 Sheets-Sheet 3

G. F. Brendel
INVENTOR
BY
Richards & Geier
ATTORNEYS

Patented Jan. 18, 1938

2,105,634

UNITED STATES PATENT OFFICE 2,105,634

MACHINE FOR FACING THE SURFACES OF HARD SUBSTANCES BY PRESSURE

Georges Fernand Brendel, Paris, France, assignor to Societe Anonyme: Societe Marbriere de Paris, Paris, France Application March 22, 1937, Serial No. 132,260
In France April 10, 1936

4 Claims. (Cl. 51—209)

The invention has for its object a machine for facing the surfaces of hard substances by pressure, which can be used for substances of very different hardnesses such as granite, porphyry, marble, glass, steel, etc.

Said machine essentially comprises a group of grinders which are mounted on spindles which are inclined relatively to the central rotary shaft and are adapted to rotate with a movement of revolution about said shaft, and which themselves simultaneously receive a reciprocating movement of adjustable amplitude, in such a manner that at the same time as the grinders rotate with a movement of revolution in contact with the substance to be worked, they effect relatively to the latter an alternate displacement in both directions, the action of which is combined with that of the general rotary movement to facilitate and improve the work obtained.

By means of this arrangement, the working grinders engage the work along an arc or line of contact which can be varied at will according to the nature of the substance to be worked.

In its construction the machine advantageously comprises an eccentric which is adjustable in position and which controls the reciprocating movement of the grinders and enables by its position to adjust the amplitude of said movement. On the other hand, the slope of the spindles carrying the grinders can also be adjusted at will by means of orientable supports, so as to vary the angle of engagement of the grinders. These two adjustments of the amplitude of the reciprocating movement of the grinders and of the slope of the spindles of these latter, can be advantageously conjugated so as to vary, as required, the arc of contact of the grinders with the substance to be worked.

The accompanying drawings show by way of example an embodiment of a machine constructed according to the invention.

Figure 1:
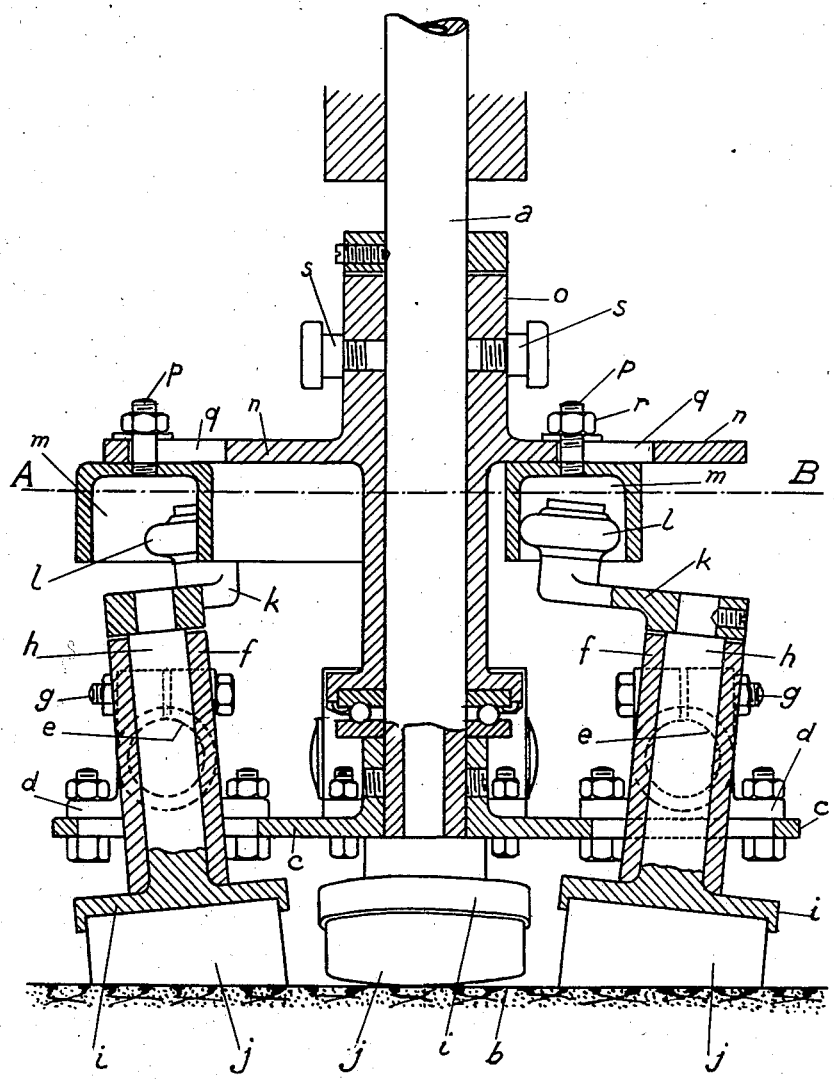
Figure 2:
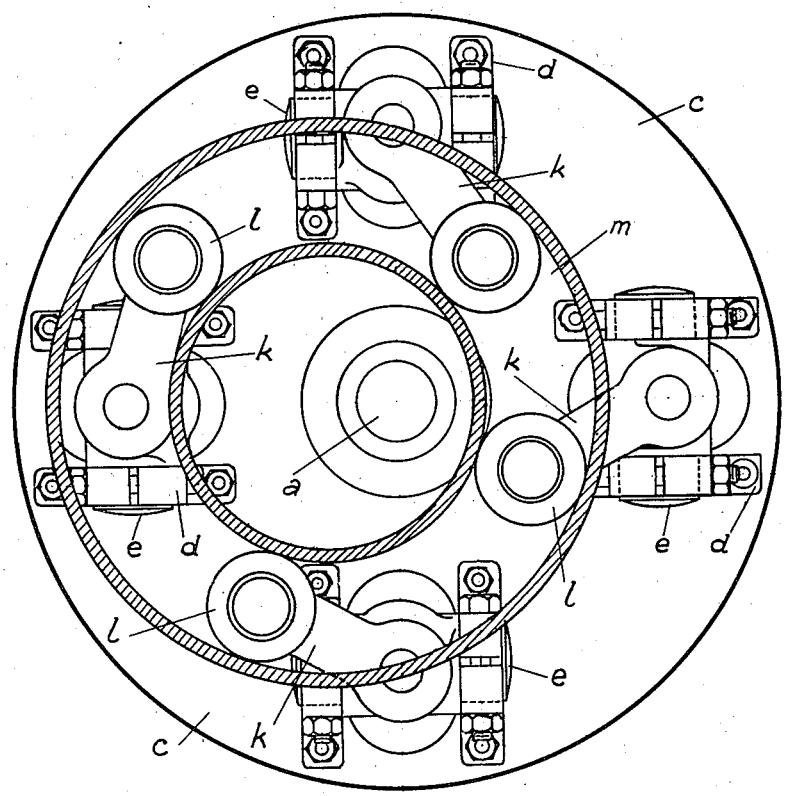
Figure 3:
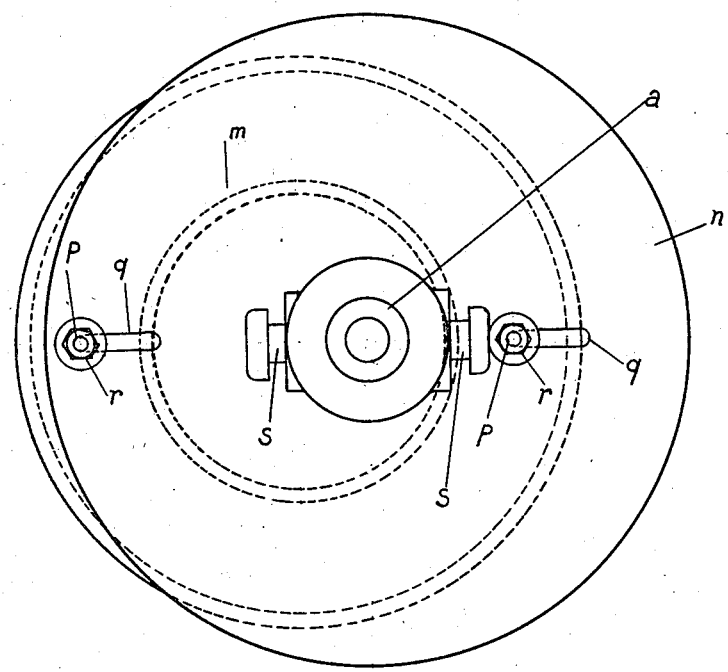

Fig. 1 of said drawings is a vertical section of the machine; Fig. 2 is a horizontal section thereof along the line A—B. Fig. 3 is a plan view thereof.

As seen in said drawings the machine comprises a rotary shaft $a$, for example tubular, which is perpendicular to the surface to be worked $b$. Said shaft drives as it rotates a plate $c$ which is secured to it. On said plate are mounted brackets $d$ which receive the trunnions $e$ of tubular bearings or bushes $f$ which can thus take up any desired slope relatively to the vertical. The holding in position of said bearings in the sloping position which has been given them is ensured by clamping bolts $g$ of the brackets $d$.

In the bearings $f$ are mounted shafts $h$ terminated at their lower part by plates $i$ on which are fixed the operating grinders $j$. At the upper part of said shafts $h$ are fixed arms $k$ provided at their ends with rotary rollers $l$ which are adapted to rotate freely.

The rollers $l$ are engaged in a part $m$ forming a cam or a circular track, and which is fixed under the lower face of a plate $n$ secured to a sleeve $o$ surrounding the central shaft $a$, the sleeve $o$ on the plate $n$ with the part $m$ not participating in the rotation of the shaft $a$. The part $m$ is eccentric relative to the axis of the shaft $a$ and it is fixed to the plate $n$, for example by means of bolts $p$ which can be displaced in the grooves $q$ of said plate and be held stationary by means of nuts $r$ in the desired position. The adjustment of the eccentricity of the part $m$ can thus be obtained by the simple displacement of the bolts $p$ in the grooves $q$ of the fixed plate $n$.

It will be understood that when the central shaft $a$ and the plate $c$ rotate, the rollers $l$, rolling in the eccentric track of the part $m$, cause through the instrumentality of the arms $k$ the reciprocating movement of the inclined spindles $h$ driving the lower operating grinders $j$. These latter therefore effect, at the same time as a movement of revolution about the central shaft $a$, a reciprocating movement of which the amplitude will be more or less great according to whether the rolling track $m$ is more or less eccentric relative to the axis of the central shaft. The desired degree of eccentricity will be chosen according to the nature of the work and the hardness of the substance to be worked.

The slope of the shafts $h$ carrying the grinders can be varied at the same time as the eccentricity. By this means, with a great eccentricity of the rolling track and with a great slope of the shafts carrying the grinders, a very small arc of contact of the grinders will be obtained with the surface to be worked, which will correspond to a very hard substance; conversely by giving a small eccentricity to the rolling track and a small slope to the shafts carrying the grinders, said arc of contact will be increased, which is suitable for materials of lesser hardness. At the limit by eliminating the eccentricity of the rolling track and the slope of the shafts carrying the grinders a surface of contact will be obtained which is equal to the surface of the grinders.

The machine which is the object of the invention thus forms a universal facing machine, which can be used for surfaces to be worked of very different hardnesses which can range from very hard substances such as granite, porphyry, glass, etc., to less hard material substances such as stones, soft marble, etc., the slope of the shafts and the eccentricity being adjusted in a corresponding manner.

The apparatus as a whole is suitably suspended from an orientable support or joint and rests, during the working operation, upon the surface to be faced with its weight. Trunnions s are carried by the fixed sleeve o on which are pivoted the two arms of a movable lever (not shown) to enable either the pressure on the surface to be increased or the whole arrangement to be lifted to displace it.

It will be understood that, according to the length of the line or arc of contact of the grinders with the substance to be worked, the pressure per unit surface will be more or less great thereby enabling the action to be effected with the same efficacity on substances of different hardnesses.

It is obvious that the details of construction which have been hereinbefore illustrated and described have only been dealt with by way of examples and that the invention is capable of many modifications, in particular the device for varying the slope of the shafts carrying the grinders and the variable eccentricity cam device could be constructed in any appropriate manner.

What I claim and desire to secure by Letters Patent of the United States is:

1. Machine for facing the surfaces of hard substances by pressure which comprises a central rotary shaft, satellite shafts inclined relatively to the central shaft and arranged about said shaft, said satellite shafts carrying grinders at their lower end, means controlled by the central shaft for giving the satellite shafts a movement of revolution about said central shaft, arms terminated by rollers and fixed to the upper ends of the satellite shafts and a fixed eccentric rolling track in which said rollers are adapted to slide to give the satellite shafts a reciprocating movement.

2. Machine for facing the surfaces of hard substances by pressure, which comprises a central rotary shaft, satellite shafts inclined relatively to the central shaft and arranged about said shaft, said satellite shafts carrying grinders at their lower end, means controlled by the central shaft to give the satellite shafts a movement of revolution about said central shaft, arms terminated by rollers and fixed to the upper ends of the satellite shafts, a fixed eccentric rolling track in which said rollers are adapted to slide, to give the satellite shafts a reciprocating movement and means for varying the eccentricity of said rolling track.

3. Machine for facing the surfaces of hard substances by pressure which comprises a central rotary shaft, satellite shafts arranged about the central shaft and carrying grinders at their lower end, a plate secured to the central shaft and provided with supporting bearings in which the satellite shafts are rotatably mounted, means for inclining at will said supporting bearings and for fixing them in position, and means for simultaneously communicating a reciprocating movement to the satellite shafts.

4. Machine for facing the surfaces of hard substances by pressure which comprises a central rotary shaft, a plate secured to said shaft and carrying supporting bearings adapted to be inclined, satellite shafts rotatably mounted in said supporting bearings and carrying grinders at their lower end, arms terminated by rollers and fixed at the upper ends of the satellite shafts, a fixed eccentric rolling track in which said rollers are adapted to slide and means for varying the eccentricity of said rolling track relative to the central shaft.

GEORGES FERNAND BRENDEL.